United States Patent [19]
Iddings

[11] 3,881,258
[45] May 6, 1975

[54] ALL ATTITUDE COMPASS
[75] Inventor: Lloyd A. Iddings, Arlington, Va.
[73] Assignee: The United States of America as represented by the Secretary of the Navy, Washington, D.C.
[22] Filed: Dec. 10, 1973
[21] Appl. No.: 423,625

[52] U.S. Cl. .................. 33/357; 33/361; 324/47 R; 336/233
[51] Int. Cl. ............................................ G01c 17/30
[58] Field of Search ............. 33/356, 357, 361, 363; 324/47 R, 43 R; 336/233, 214

[56] References Cited
UNITED STATES PATENTS

| | | | |
|---|---|---|---|
| 3,584,388 | 6/1971 | Petrov et al. | 33/361 |
| 3,601,899 | 8/1971 | Artz | 33/361 |
| 3,628,254 | 12/1971 | Barmeister | 33/357 |
| 3,678,593 | 7/1972 | Baker et al. | 33/361 |

Primary Examiner—William D. Martin, Jr.
Attorney, Agent, or Firm—R. S. Sciascia; Q. E. Hodges

[57] ABSTRACT

A magnetic compass of the flux valve type, capable of proper indication in all attitudes within the earth's magnetic field. When the compass is mounted in a vehicle, it compensates for vehicle orientation and motion, and deviation or installation error may also be compensated for. The compass is provided with four compensating poles arranged 120° spherically apart from each other radiating from a center. Each set of three poles of the four operates much like a conventional flux valve, but vehicle pitch and roll are compensated for by energizing the compass system with synchro-signals indicative of the vehicle's attitude. Alternatively, the flux valve compass system will act as a compass and attitude indicator showing azimuth, pitch, and roll, when these signals are not supplied.

21 Claims, 3 Drawing Figures 3,881,258

ALL ATTITUDE COMPASS

The invention described herein may be used by or for the Government of the United States of America for governmental purposes without the payment of any royalties thereon or therefor.

BACKGROUND OF THE INVENTION

Typical magnetic compasses are intended to measure only the horizontal component of the earth's magnetic field. In a fixed horizontal position or mounted on gimbals in a slowly moving vehicle, the magnetic compass, normally, will orient itself accurately and conveniently on the north magnetic pole and indicate azimuth directions on the earth through 360°. However, when a magnetic compass is mounted in a fast moving vehicle, such as an aircraft, and which has three-degrees-of-freedom of pitch, yaw, and roll, it is unreliable as a direction indicator. The compass will lead or lag a turn to the left or right depending on whether the basic direction of travel is north or south, and so called northerly and southerly turning error. Also, acceleration and deceleration of the vehicle will affect the compass reading. Further, the compass will not indicate the proper heading when the aircraft is in a bank because the compass card is not level. This phenomenon is due to "dip" or declination of the magnetic lines of force and vary with latitude. Only at the magnetic equator are the lines of force parallel to the surface. While it is possible to instruct a pilot in these idiosyncrasies of the magnetic compass, they are next to impossible to remember during the rigors of flight. For this and other reasons the gyroscope compass was developed to provide a reliable heading indicator, But directional gyro compasses relying only on their rigidity in space also have their shortcomings, notably drift due to bearing drag and windage, and therefore, must be caged and reset to a standard magnetic compass often during a journey.

Recently, remote indicating slaved gyro magnetic compass systems using flux valve type magnetic detectors have been developed which greatly reduce the difficulties of the magnetic compass and the gyro compass and permit 30° of pitch and bank without introducing the above discussed major errors in the compass readout. In these systems, the flux valve transmitter is affixed to turn with the aircraft, and has a universal suspension allowing it to hang in a pendulus manner so as to substantially maintain a horizontal plane. Thus, the flux valve unit normally detects the horizontal component of the earth's magnetic field as the vehicle moves in three-degrees-of freedom.

Associated with this remote indicating compass system is a directional gyro that maintains a constant directional reference due to its rigidity in space. The case of the gyro moves in azimuth about the rigid gyro as the aircraft turns, and relays the turn information to a cockpit directional indicator. An amplifier is used in the system and coordinates and distributes the various signals from both the gyro and the flux valve. After the flux valve detects the lines of magnetic force, the signal is amplified and relayed to a direction gyro control torque motor. The torque motor precesses the gyro to align it in phase with the signals from the flux valve transmitter. Only when the flux valve transmitter is level with the earth's surface, and therefore receives no false information concerning the horizontal component, will its signal be used to "update" or precess the directional gyro. This condition exists only in straight, level, and unaccelerated flight, because the universal gimbal and pendulous mounting does not maintain the flux valve transmitter in a continuous horizontal plane during coordinated and uncoordinated turns and changes in pitch and speed.

The current state-of-the-art slaved gyro magnetic compass is not the complete answer, however. At least two other disadvantages are the facts that the pendulus flux valve is limited to a 30° swing from horizontal and the gyro repeater compass is limited to an 82° pitch and roll of the vehicle. However, the advantages of the system are apparent. The small dip error inherent in the flux valve transmitter is eliminated in the system because the flux valve signal is used to "update" only when it is accurate, and also, the instrument is gyro stabilized.

SUMMARY AND OBJECTS OF THE INVENTION

Accordingly, an object of the instant invention is to provide a new and improved all-attitude compass and an attitude indicator.

Another object of the instant invention is to provide an improved flux valve transmitter and compass system.

Still another object of the present invention is to provide a magnetic flux detector for a vehicle compass system capable of compensating for all undesired components of the earth's magnetic field to provide an accurate magnetic azimuth readout.

A further object of the present invention is to provide a reliable magnetic compass for a moving vehicle regardless of its attitude.

A still further object of the instant invention is to provide a flux valve for a vehicle magnetic compass system capable of providing an attitude and azimuth readout in any orientation with the earth's surface.

Another object of the instant invention is to provide a flux detector capable of detecting all directional components in a magnetic field.

Still another object of the present invention is to provide a vehicle attitude indicator utilizing the earth's magnetic field as its basis.

Briefly, these and other objects of the instant invention are attained by the use of a flux valve detector for an all-attitude compass system having four poles equiangularly spaced and radially extending from a point or sphere to provide poles at 120 spherical degree spacing. In other words, a fourth pole is added to the typical flux valve detector and all poles are oriented 120° spherically from each other. The flux valve then operates as a three-dimensional device, where each set of three poles operate like a typical flux valve. The poles are made of soft iron or ferroceramic to detect a magnetic field, and wound with coils to be energized with sychro-signals indicative of the vehicles orientation in the magnetic field. Compensating slugs may be installed in each pole to compensate for compass deviation or installation error. The flux valve feeds its signals to an amplifier and computer which operates a compass card and readout device. The compass card indicates only the horizontal component of the earth's magnetic field and therefore an accurate magnetic azimuth when attitude servo signals are applied. Alternatively, the attitude of the vehicle may be derived from the system using the earth's magnetic field as a basis.

BRIEF DESCRIPTION OF THE DRAWINGS

A more complete understanding of the invention and many of the attendant advantages thereof will be readily appreciated as the same become better understood by reference to the following detailed description when considered in connection with the accompanying drawings wherein.

DESCRIPTION OF THE PREFERRED EMBODIMENT

Figure 1:
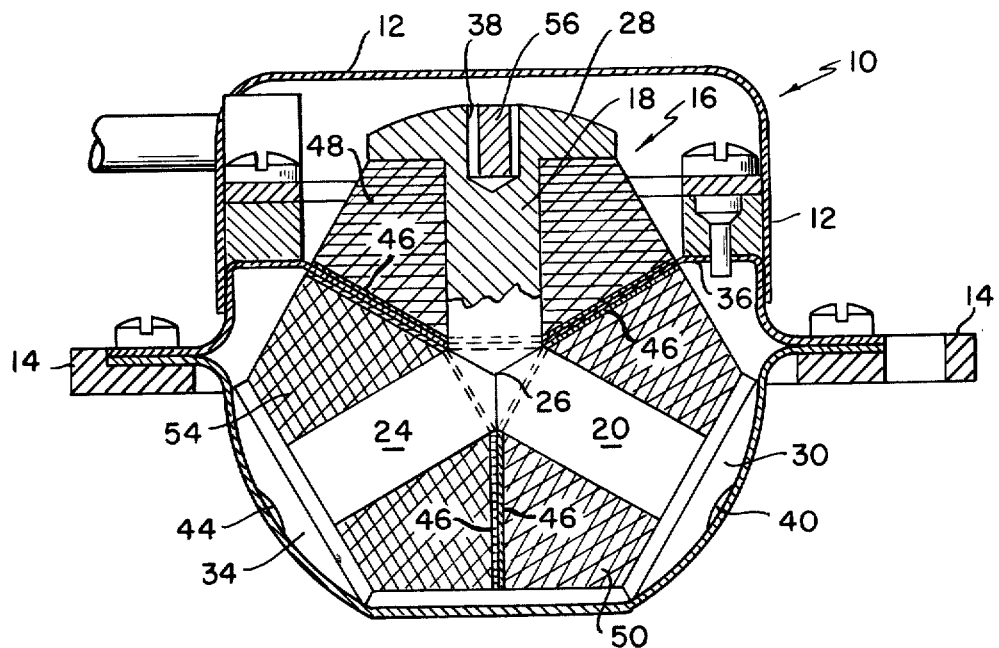
FIG. 1 is an isometric view, partially cut away, of the flux valve transmitter according to the instant invention.

Referring now to the drawings wherein like reference numerals designate corresponding parts throughout the several views, there is shown generally in FIG. 1, a flux valve transmitter 10 having a non-magnetic case 12, and a mounting support ring 14 for attachment to the vehicle (not shown). Contained within the case 12 is a flux valve 16 according to the instant invention.

Figure 2:
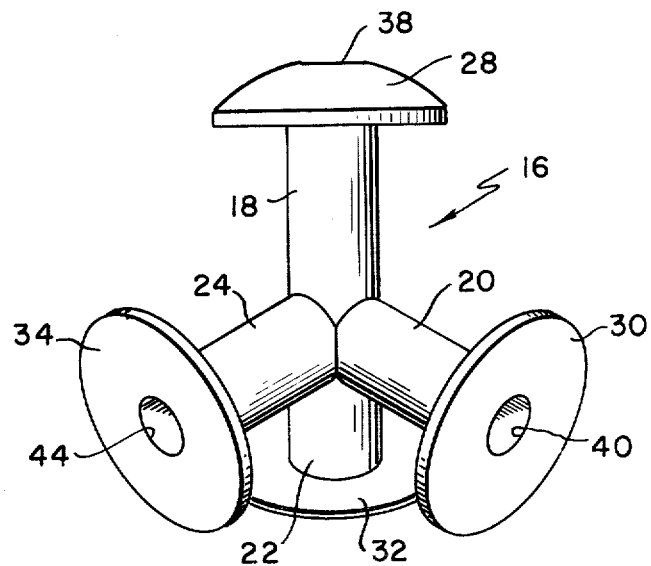
FIG. 2 is an isometric view of the flux valve "spool" according to the invention.

Referring particularly to FIG. 2, the flux valve 16 comprises a "spool" 18, made of soft iron or a ferroceramic, having four integral poles 18, 20, 22, 24, each spherically equiangularly spaced, and therefore radiating outwardly from a center 26 at 120° degrees from each other. The arms terminate at the distal ends in integral flanges 28, 30, 32, and 34. Bored centrally in each spool end and flange are holes 38, 40, 42, and 44, for containing compensating slugs or the like, to be explained later.

Figure 3:
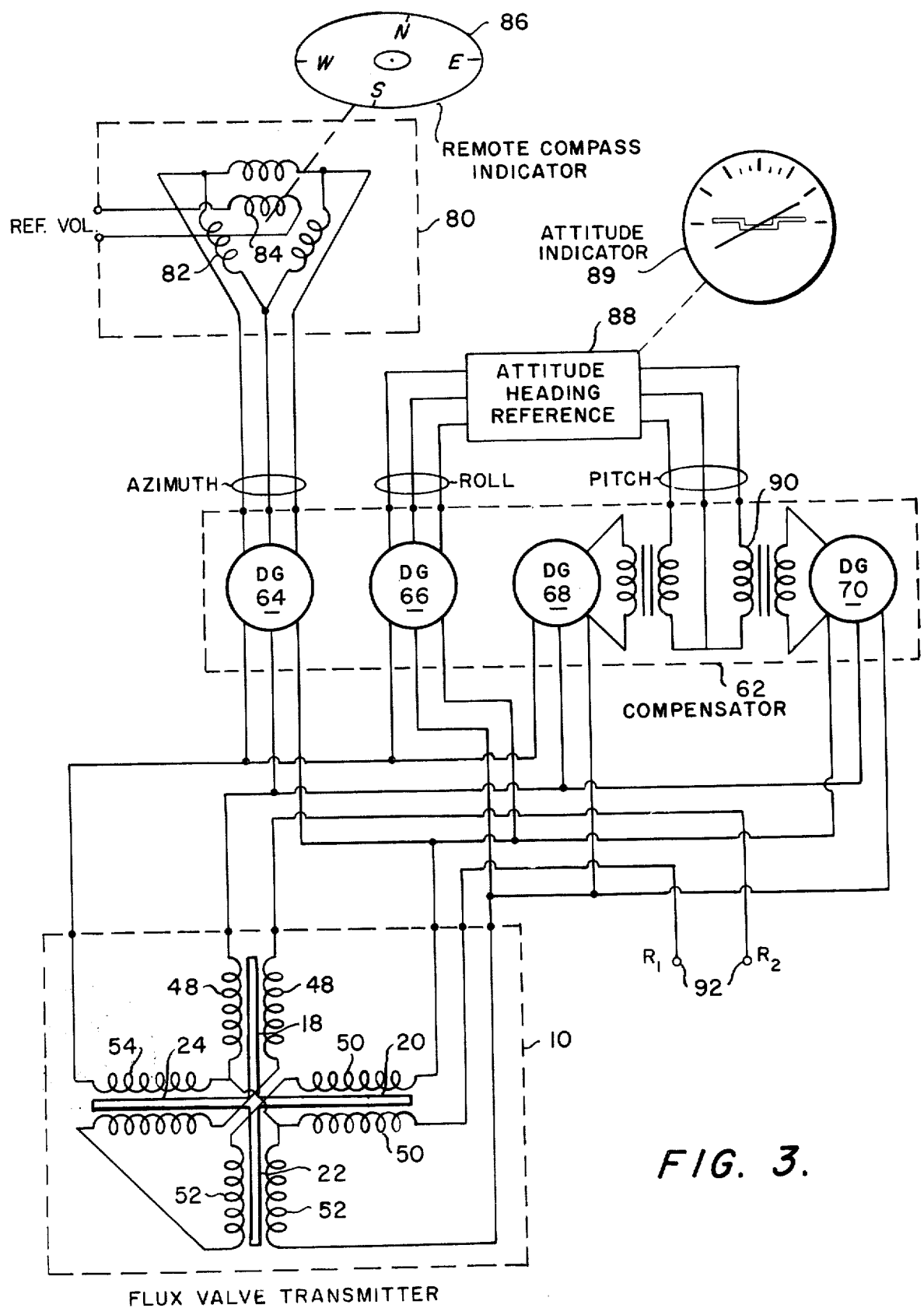
FIG. 3 is an electrical schematic diagram of the flux valve and system connected to produce usable output signals.

Referring now to FIGS. 1 and 3, around each pole of the spool 18 is wound a bifilar electrical coil 48, 50, 52, 54. The winding 48 of the top vertical arm 18 is isolated from the other windings by a shield 36 made of brass or other non-magnetic material which acts also as a rigid support for the flux valve 16. The other windings 50, 52, 54 of the subtending poles 20, 22, 24 are insulated from each other at the center 26 by a truncated cone-shaped insulator 46 made of polystyrene or the like. If necessary to correct for compass deviation and installation error, a compensating slug made of brass, soft iron, or ferrite 56 (one shown) may be placed in each of the holes 38, 40, 42, 44 at the spool ends.

Referring particularly to FIG. 3, a schematic diagram of the all-attitude compass system is shown including the flux valve transmitter 10 its poles 18, 20, 22, 24, and its bifilar wound coils 48, 50, 52, 54. A reference voltage designated $R_1$ and $R_2$ of 110 volts, signal phase, 800Hz is fed into terminals 92 of the all-attitude compass system and thence through the windings of the flux valve transmitter. The windings are connected to a compensator 62, comprising a plurality of differential synchro generators 64, 66, 68, 70 connected for electrical operation, on azimuth, roll, and pitch signals.

The differential synchro generators are three-phase transformers having two inductively coupled delta-connected windings. One set of delta-connected windings of each is connected to one of the flux valve transmitter windings 48, 50, 52, 54 to relay signals therefrom. The other set of windings are connected to a remote compass indicator 80 or to an attitude heading reference 88 shown in block form.

Specifically, one delta-connected winding of the pitch differential generators 68 and 70 are connected to the attitude heading reference 88 via a "Scott T" type transformer 90 which essentially marries two three-phase signals into a one three-phasee signal. A bias phase-angle may be introduced in three-phase of the differential synchro transformers for compensation purposes by rotating the relative position of the delta-connected windings with a control knob (not shown).

Connected to the azimuth differential generator is a remote compass indicator 80 comprising essentially a synchro receiver having a stationary delta-connected winding 82 connected to the differential generator 64. A rotatable winding 84, within the field of the delta-connected winding, is fed with a reference voltage and mechanically connected to a readout compass card 86 or the like for indicating magnetic azimuth to the pilot.

Connected to the roll differential generator 66 is an attitude heading reference 88 shown in block form and is a conventional instrument system used by most aircraft to provide roll and pitch information to the pilot, and here provides roll and pitch compensation signals to the all-attitude compass system.

DESCRIPTION OF THE OPERATION

The operation of the all-attitude magnetic compass will be described hereinafter as follows. Initially, the flux valve transmitter 10 is installed rigidly at a remote point in the vehicle, for example in the wing of an aircraft, with the one pole 18 of the spool 16 vertical and the other three poles subtending equiangularly downward as shown in FIGS. 1 and 2. The remote compass indicator 80 and compass card 86 are mounted on the instrument panel for ready observation by the pilot. The compensator 62 including the azimuth differential generator 64, the roll differential generator 66, and the two pitch differential generators 68 and 70 with the associated "Scott T" transformer 90 may be located in any convenient place in the vehicle. The attitude heading reference 88, and attitude indicator 89, normally provided in modern aircraft is located on the instrument panel for observation by the pilot.

In actual operation, as an all-attitude fully compensated compass system, any triad of the four poles of the flux valve transmitter 10 that is oriented closest to a horizontal plane at any one time detects the horizontal component of the earth's magnetic field. It senses the magnetic lines of force concentrated in any one pole of the triad and relays this information to the compensator 62, where it may be amplified, processed, and compensated.

A detailed description of the flux valve transmitter 10 is as follows. Each pole 18, 20, 22, 24 is activated as an electromagnet by a current from the reference voltage $R_1$, $R_2$ at terminals 92. The resultant magnetic field generates signal voltages in the bifilar wound windings 48, 50, 52, 54, on the poles by transformer action. The windings on their respective poles are electrically connected to produce four distinct three-phase synchro outputs. The output signal from each three-phase transformer, that is, each triad of poles is varied by the variations in the earth's magnetic field and the alignment of the pole triads to the magnetic field. Therefore, the variation in signals related to the alignment with the earth's magnetic field in both the vertical and horizontal planes, give rise to magnetically generated azimuth heading and attitude signals. Each of the three-phase transformer windings for azimuth, roll, and pitch are connected to respectively, the azimuth differential generator 64, the roll differential generator 66, and the two pitch differential generators 68 and 70 where the signals are phase shifted for compensation.

The three-phase signal of the azimuth differential generator 64 is fed to the synchro receiver windings 82 of the remote compass indicator 80 and causes the winding 84, and consequently the compass card 86, to align itself by rotation with the phased signals in the windings 82. A constant phase reference signal is supplied to the winding 84 to create the electromagnetic force that causes alignment as is common in synchromotor systems.

During the same time the flux valve transmitter is detecting the earth's magnetic field, the attitude heading reference 88 senses the attitude of the vehicle and sends a roll signal to the roll differential generator 66, and a pitch signal to the "Scott T" transformer 90 and thence to the pitch differential generators 68 and 70 in the compensator 62 where the signals are processed and phase shifted to provide an attitude-compensated signal to the windings 48, 50, 52, 54 of the flux valve transmitter 10. Because the flux valve transmitter may be misaligned in installation, or the vehicle may have local and variable magnetic fields which would distort the compass readings, the synchro type input and output signals are conducted through these differential synchro generators which are manually adjustable for compensation of the deviation and variation. These roll and pitch signals completely compensate the flux valve transmitter so that the output of the system is a fully compensated magntic azimuth of the vehicle with no northerly and southerly turning errors or acceleration and deceleration errors caused by the magnetic dip angle.

Any possible imbalance of the magnetic flux in the poles of the flux valve transmitter 10 caused by nonuniformity of material or windings may be equalized by cementing a slug 56 made of brass, soft iron, or ferrite in one or all the holes 38, 40, 42, 44.

When the all-attitude magnetic compass is used alternatively as an attitude and azimuth reference, the operation is as follows. Rather than the roll and pitch differential synchro generators 66, 68, 70 receiving compensating signals from the attitude heading reference 88, the differential generators supply signals derived from the flux valve transmitter. These signals are then fed to the attitude heading reference 88 which includes a pitch and roll attitude indicator 89 for use by the pilot as a back-up or secondary instrument for safety-of-flight applications. The flux valve transmitter in this application senses both the horizontal and vertical components of the earth's magnetic field. Therefore, using the lines of force as a basis, the flux valve is capable of determining both an azimuth and a vertical axis, and deviations therefrom to provide roll and pitch information. It is to be understood, however, that in this mode the azimuth readout is uncompensated, but no worse than the conventional magnetic compass and flux valve systems.

Obviously, many modifications and variations of the present invention are possible in light of the above teachings. It is therefore to be understood that within the scope of the appended claims, the invention may be practiced otherwise than as specifically described.

What is claimed is:

1. An all-attitude magnetic compass and detector system compensated for magnetic variation, deviation, and dip comprising:
    a flux valve transmitter having a four pole spool wherein said poles are spherically equiangularly spaced radiating from a common center;
    an electromagnetic coil wound about each of said poles;
    an azimuth differential synchro generator connected to said flux valve transmitter and deriving signals therefrom:
    a remote compass indicator connected to said azimuth differential synchro generator;
    a roll differential synchro generator connected to said flux valve transmitter and providing roll compensating signals thereto;
    an attitude heading reference for providing signals representing roll and pitch information; and
    a pair of pitch differential synchro generators connected between said attitude heading reference and said flux valve transmitter and providing pitch compensating signals thereto;
    whereby said remote compass indicator displays accurate magnetic azimuth free of northerly and southerly turning errors and acceleration and deceleration errors.

2. The all-attitude magnetic compass and detector system of claim 1, wherein said flux valve is further defined by:
    a flange at the distal end of each pole; and
    a hole bored in the distal end of each pole.

3. The all-attitude magnetic compass and detector system of claim 2 wherein:
    said flux valve spool is made of a ferro ceramic.

4. The all-attitude magnetic compass and detector system of claim 2, wherein:
    said flux valve spool is made of soft iron.

5. The all-attitude magnetic compass and detector system of claim 2 wherein:
    said electromagnetic coils are bifilar wound.

6. The all-attitude magnetic compass and detector system of claim 2 wherein said remote compass indicator is further defined by:
    a synchro receiver having a rotatable winding;
    a shaft mechanically connected to said rotatable winding; and
    a compass card display connected to said shaft for ready reference by a pilot.

7. The all-attitude magnetic compass and detector system of claim 2, further comprising:
    a Scott-T transformer interconnected between said pitch differential synchro generators and said attitude heading reference.

8. A transmitter for a flux valve compass system, comprising:
    a spool made of a ferro-magnetic material having four integral poles spherically equiangularly spaced about a common center;
    an integral spool flange formed on the distal end of each of said four poles;
    a hole bored concentrically in the flange of each of said four poles; and
    a coil wound on each of said four poles.

9. The transmitter of claim 8 wherein:

said coils are bifilar wound.

10. The transmitter of claim 9, wherein:
said spool is made of a ferro-ceramic.

11. The transmitter of claim 9, wherein:
said spool is made of soft iron.

12. The transmitter of claim 9, wherein:
said bifilar wound coils are interconnected.

13. The transmitter of claim 12 wherein said holes contain:
a slug made of a material taken from the group consisting of brass, soft iron, and ferrite.

14. A compass and attitude readout system of the flux valve type comprising:
a flux valve transmitter having four poles for detecting the horizontal and vertical components of the earth's magnetic field and providing signals;
an electromagnetic coil wound about each of said poles;
an azimuth differential synchro generator connected to said flux valve transmitter for receiving substantially the horizontal component;
a roll differential synchro generator connected to said flux valve transmitter; for receiving substantially the vertical signal component;
a pair of pitch differential sychro generators connected to said flux valve transmitter; for receiving both the horizontal and vertical signal components;
an attitude indicator connected to said roll and pitch differential synchro generators for displaying pitch and roll information to the pilot; and
a azimuth indicator connected to said azimuth differential synchro generator for displaying magnetic azimuth information to the operator.

15. The compass and attitude readout system of claim 14, wherein said flux valve is further defined by:
a four pole integral spool wherein said poles are spherically equiangularly spaced radiating from a common center;
a flange at the distal end of each pole; and
a hole bored in the distal end of each pole.

16. The compass and attitude readout system of claim 15 wherein:
said flux valve spool is made of a ferro ceramic.

17. The compass and attitude readout system of claim 15 wherein:
said flux valve spool is made of soft iron.

18. The compass and attitude readout system of claim 15 wherein:
said electromagnetic coils are bifilar wound.

19. The compass and attitude readout system of claim 15 wherein said azimuth indicator is further defined by:
a synchro receiver.

20. The compass and attitude readout system of claim 19 wherein said synchro receiver further comprises:
a stationary delta-connected coil winding;
a movable coil winding in electromagnetic coupling relationship with said stationary coil winding;
a shaft mechanically connected to said movable coil winding; and
a compass card display connected to said shaft.

21. The compass and attitude readout system of claim 15, further comprising:
a Scott-T transformer interconnected between said pitch differential synchro generators and said attitude indicator.

* * * * *